Sept. 29, 1936.   C. A. WICKLIFFE   2,056,116
AUTOMOBILE JACK
Filed Feb. 20, 1935   2 Sheets-Sheet 1

Inventor
Charles A. Wickliffe
By Wilkinson & Mawhinney
Attorneys.

Sept. 29, 1936.  C. A. WICKLIFFE  2,056,116
AUTOMOBILE JACK
Filed Feb. 20, 1935  2 Sheets-Sheet 2
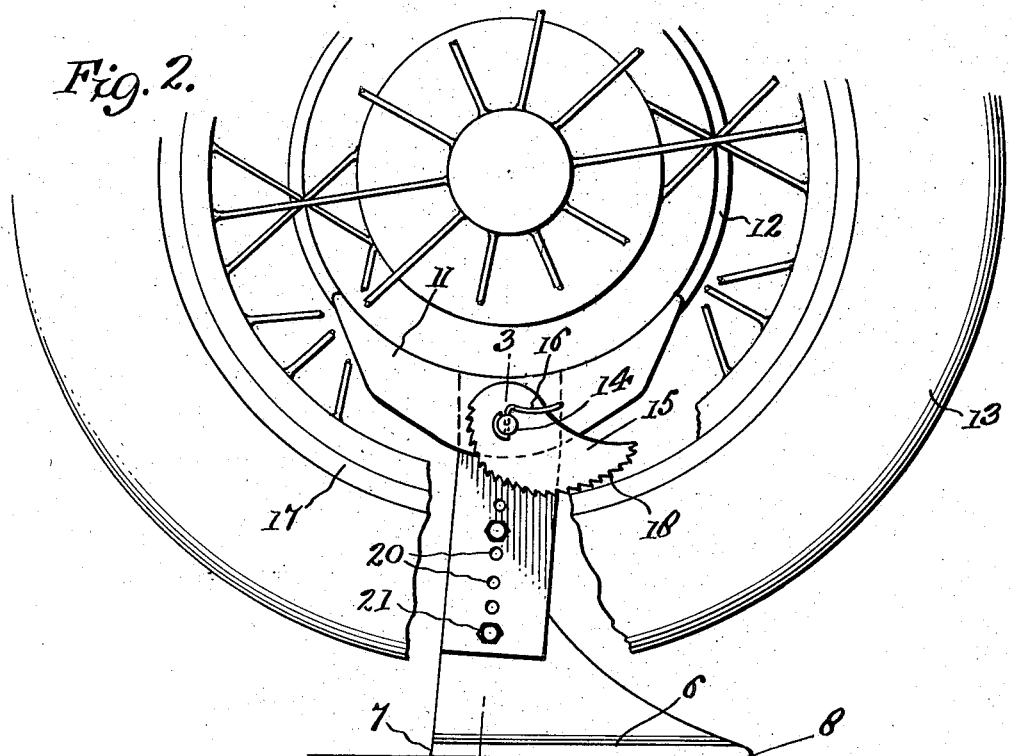
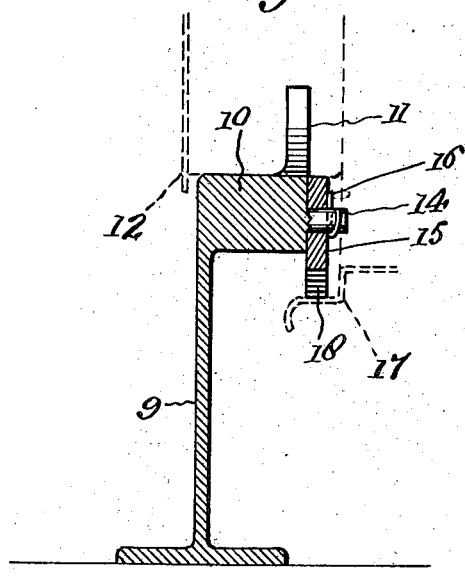
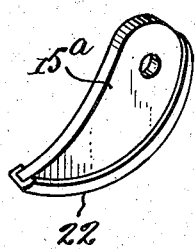
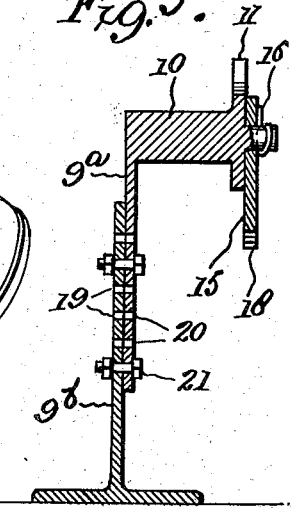
Inventor
Charles A. Wickliffe
By Wilkinson & Mawhinney
Attorneys.

Patented Sept. 29, 1936

2,056,116

UNITED STATES PATENT OFFICE 2,056,116

AUTOMOBILE JACK

Charles Anderson Wickliffe, United States Army, Fort Riley, Kans., assignor of thirty per cent to Gerald J. Nash, thirty per cent to William C. Krauss, and forty per cent to himself Application February 20, 1935, Serial No. 7,413

7 Claims. (Cl. 254—94)

The present invention relates to improvements in automobile jacks and has for a two-fold object, first to avoid the necessity of having to get under the vehicle in order to place the jack thereunder when occasion necessitates its use, and second, to eliminate the manual operation of the jack in order to raise the wheel off the ground.

Another object of the invention is to secure the elevation of the wheel above the ground by means of the rotation of the wheel either by the motive power of the car or by the force of gravity.

A still further object of the invention resides in providing an improved jack of a simple mechanical form of construction applicable to the hub and felloe of the wheel which is designed for easy placement in an initial potential position in readiness to elevate the wheel when such wheel shall be rotated through a small angular distance.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation of a wheel showing the application thereto in initial potential position of an automobile jack constructed in accordance with the present invention.

Figure 2 is a fragmentary side view showing the wheel in elevated position supported by the jack.

Figure 3 is a vertical section taken on the line 3—3 in Figure 2.

Figure 4 is a similar view showing a modified form of leg or shaft.

Figure 6 is a similar view of a modified form of cam.

Figure 1:
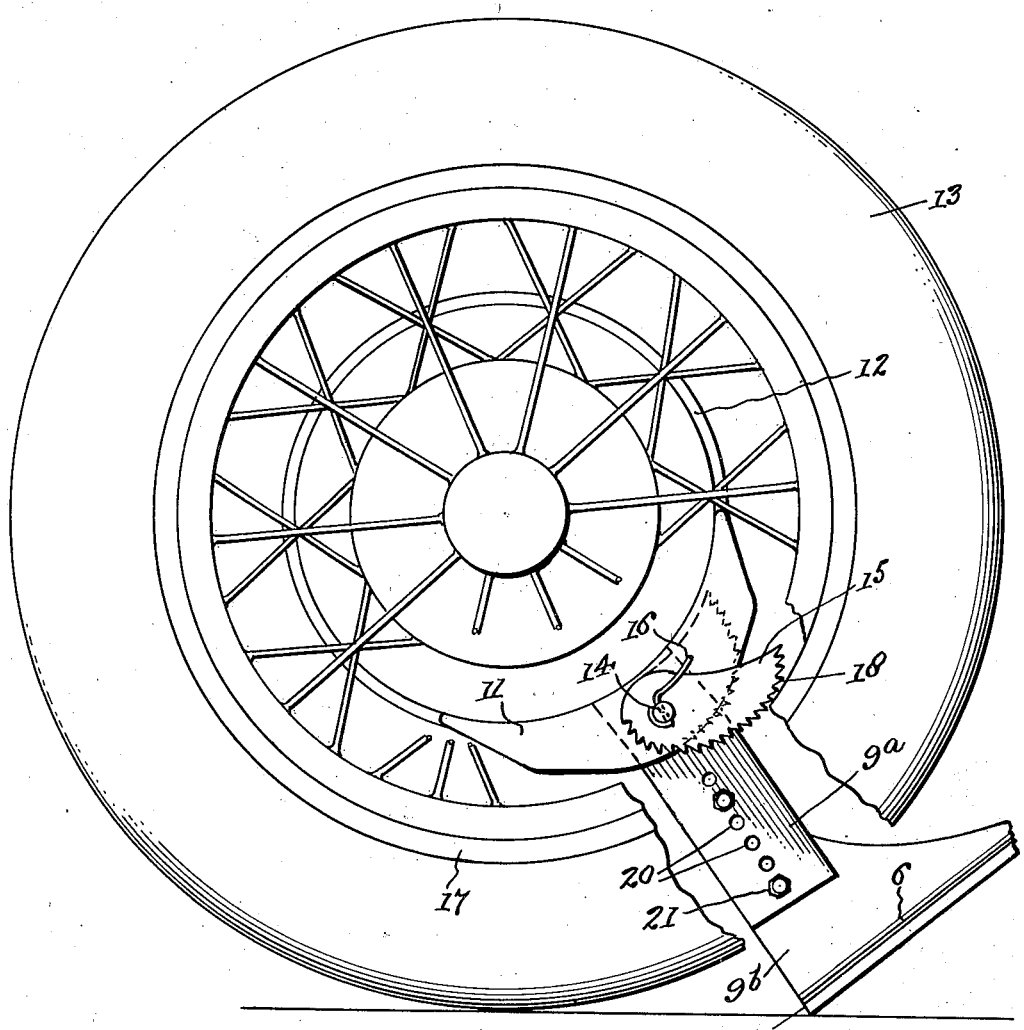
Figure 5:
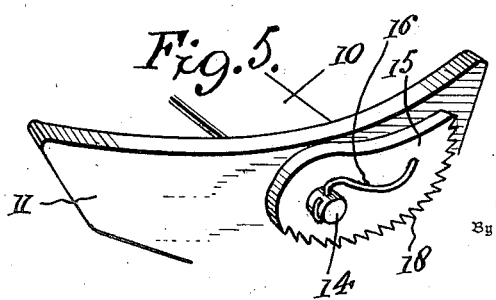
Figure 5 is a perspective view of the cam and cradle.

Referring more particularly to the drawings, 6 designates a base or foot having a toe 7 and a heel 8. From the foot 6 rises a shaft or leg 9.

As shown in Figures 3 and 4, the leg carries a head 10, which head is offset to one side of the leg 9 and at its outer portion, remote from the leg 9, it supports an arc-shaped cradle 11 of a form to fit the brake drum 12 of the wheel 13 of the automobile or other vehicle. From the side of the head 10 remote from the leg 9, which side of the head we will call the outer side, extends a stud 14 upon which is pivotally mounted a cam 15. The end of the stud 14 projects outwardly beyond the cam 15 and is perforated diametrically or otherwise to receive therethrough one end of a wire or spring member 16. This spring member 16 subserves two functions; first, it acts as a cotter pin or key to removably retain the cam or dog 15 upon the stud 14, and in the second place, the outer free end of this spring 16 is bent toward and slightly into the plane of rotation of the cam 15 so as to exert a resilient yieldable pressure upon the cam 15 to the end of retaining this cam in any angular position to which it may be set, it being understood that the cam 15 is loosely mounted over the stud 14 and may be rotated around the stud freely except insofar as resilient restraint upon the cam is made by this spring member 16. The spring member 16 will therefore hold the cam 15 in any desired position, for instance, in the position shown in dotted lines in Figure 1, while placing the jack in the position indicated in Figure 1 just prior to the elevation of the wheel 13 from the ground.

In operation, the device is initially placed in the position shown in Figure 1 with the arc-shaped cradle 11 in contact with the brake drum 12 of the wheel 13 which it is desired to raise. The toe 7 is placed in contact with the ground forwardly in respect to the direction in which the wheel is to be turned and moved in the act of "jacking-up" the same. In this position the shaft or leg 9 will be at an angle with the vertical and the foot 6 will be at an angle with the horizontal. The heel 8 will be out of contact with the ground. The pressure of the spring member 16 will hold the cam 15 in the dotted line position shown in Figure 1 while the device is being placed. The pressure of the spring member 16 is thereupon released permitting the cam 15 to rotate on the stud 14 by the action of gravity or by the conscious act of the operator. It will of course not be necessary to pry the spring member 16 away from the cam but the operator may forcibly rotate the cam 15 about the stud, which stud will be non-rotatable and therefore the spring will remain in the position shown in Figure 2, its outer end having slipped off the cam 15. By either the action of gravity or by the conscious forceful action of the operator, the cam surface of the dog 15 is brought into contact with the felloe 17 of the wheel 13. Preferably the cam surface is toothed as indicated at 18 with the teeth being inclined in the direction shown whereby clock-wise rotation of the wheel 13, such as when the automobile is being driven in a forward direction to the right as viewed in Figures 1 and 2, will cause the wheel 13 to so react upon the inclined teeth 18 as to tend to rotate the cam 15 in a clockwise direction also; thereby binding the cam tightly upon the felloe and causing a reaction radially inward, which results in the cradle 11 more forcibly engaging the hub 12.

Motive power is then applied to the vehicle, causing the wheel 13 to which the jack has been affixed to turn. This turning action causes the cam 15 to rotate slightly due to the grip of the teeth 18 on the felloe 17 of the wheel and thereby camming the arc cradle 11 tightly against the brake drum or hub 12 and thus locking the device to the wheel. Motive power is continued to be applied to the vehicle until the wheel 13 with the device locked to it has turned a sufficient angular distance, for instance, from the position shown in Figure 1 to that shown in Figure 2, as to bring the shaft or leg 9 to vertical position under the axle of the wheel, at which time the foot 6 will rest flat on the ground and the tire of the wheel 13 will be raised from contact with the ground. The tire or wheel may now be removed from the hub.

To lower the vehicle to the ground, motive power is again applied but this time in the opposite direction to that employed to raise the wheel, and when the wheel has turned a sufficient distance to bring it into firm contact with the ground the device may be removed.

As shown more particularly in Figure 3, the leg may be made in two sections, an upper section 9a and a lower section 9b with series of perforations 19 and 20 therein adapted to overlap in various relations whereby to change the elevation of the head 10 to accommodate the device to various types and styles of vehicles. Bolts 21 pass through registering perforations in order to hold the sections in the adjusted position.

Referring more particularly to Figure 6, a modified form of cam device 15a is illustrated lacking the teeth but instead being provided with a rubber shoe or friction lining 22 which will frictionally grip the felloe of the wheel. The leg or shaft 9 may be attached at right angles to the base or foot 6, or these parts may be made to assume a desired relation. An angular relation of 85° is to be preferred as this shifts the downward thrust near the center of the foot of the jack and causes the weight of the car to drop beyond dead center upon coming to rest upon the jack and this assures greater stability. This angle of 85° is with reference to the inclination of the leg 9 toward the heel 8 as shown in Figure 2.

Although in Figure 1 the jack is shown as occupying an initial position to the right which has been described as a forward position with respect to the front of the automobile or with respect to the direction of forward movement of the vehicle, nevertheless the device will work equally well if the jack is tilted to the rear on the heel 8, whereupon by rearward movement of the car the jack may be made to arrive at the position shown in Figure 2 thus elevating the wheel 13 from the ground.

On vehicles where there is an external brake band, which naturally does not rotate with the wheel, and on vehicles where the drum does not rotate with the wheel, or in any case where applying power in the direction opposite to that in raising the car does not cause the car to move off of the jack, the cam is removed from the stud and replaced thereon with the tail of the cam pointing in the opposite direction to the first position and after it is contacted with the felloe, power is applied in the appropriate direction.

It will be obvious that various changes may be made in the construction, combination and arrangement of parts which could be used without departing from the spirit of my invention and I do not mean to limit the invention to such details except as particularly pointed out in the claims.

Having thus described my invention, what I claim and desire to secure by Letters Patent of the United States is:—

1. A jack for vehicle wheels, having felloes and brake drums, comprising a supporting member including a foot, leg and cradle for fitting the brake drum, and a pivoted cam on the member for engaging the felloe and on rotation of the wheel to lock the jack thereto to tighten said cradle against the brake drum and lock the jack to the wheel.

2. A jack for vehicle wheels, having felloes and brake drums, comprising a supporting member having a ground-engaging part and a brake-drum-engaging part, and a cam pivoted loosely at the side of the supporting member within the perimeter of the wheel and positioned to engage the felloe and on rotation of the wheel in one direction lock the supporting member to the wheel.

3. A jack for vehicle wheels, having felloes and brake drums, comprising a supporting member for engaging the ground at one end and the brake drum at the other end, a stud projecting forwardly from the side of the supporting member, a cam loosely pivoted on said stud, within the perimeter of the wheel, and positioned to engage the felloe and increasingly bind upon the felloe as the wheel is rotated in one direction, and resilient means on the supporting member to engage the cam whereby to hold it out of contact with the felloe.

4. A vehicle jack comprising a ground engaging portion, a brake drum engaging portion, an eccentric cam member adapted to engage the felloe of the wheel and on rotation thereof to tighten the brake drum engaging portion against the brake drum and lock the jack to the wheel, and means for releasably holding said cam in inoperative position.

5. A vehicle jack comprising a ground engaging portion, and means carried by said portion for engaging concentric opposed surfaces of a wheel, said means acting against said surfaces on rotation of the wheel to bind the jack to the wheel.

6. A vehicle jack comprising a ground engaging portion, and means carried by said portion for engagement with two opposed surfaces of a wheel, said means adapted to react in opposite directions on rotation of the wheel to bind the jack to the wheel.

7. A vehicle jack comprising a ground engaging portion, a brake drum engaging portion, and means engaging the felloe and adapted to react against the felloe and against said brake drum when the wheel is rotated to lock the jack to the wheel at the brake drum engaging portion and at the felloe engaging means.

CHARLES ANDERSON WICKLIFFE.